US006694764B1

(12) United States Patent
Eckstein, Jr. et al.

(10) Patent No.: US 6,694,764 B1
(45) Date of Patent: Feb. 24, 2004

(54) AIR CONDITIONING SYSTEM WITH ELECTRIC COMPRESSOR

(75) Inventors: Taylor R. Eckstein, Jr., N. Tonawanda, NY (US); Thomas Martin Urbank, Lockport, NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/393,591

(22) Filed: Mar. 21, 2003

(51) Int. Cl.[7] ............................................. F25B 49/00
(52) U.S. Cl. ........................... 62/228.3; 92/12.2; 92/13; 417/222.2
(58) Field of Search ........................ 62/228.3, 228.4, 62/228.5, 236, 323.3, 324.6; 92/12.2, 13; 417/222.2, 222.1

(56) References Cited

U.S. PATENT DOCUMENTS

| 4,880,360 A | * 11/1989 | Terauchi et al. | 417/222.2 |
| 5,092,741 A | * 3/1992 | Taguchi | 417/222.2 |
| 5,145,325 A | * 9/1992 | Terauchi | 417/222.2 |
| 6,230,507 B1 | 5/2001 | Ban et al. | 62/228.4 |
| 6,247,900 B1 | 6/2001 | Archibald et al. | 417/222.1 |
| 6,439,857 B1 | * 8/2002 | Koelzer et al. | 417/222.1 |
| 6,484,520 B2 | * 11/2002 | Kawaguchi et al. | 62/133 |
| 6,550,260 B1 | * 4/2003 | Sullivan | 62/126 |
| 6,617,727 B2 | * 9/2003 | Iwasa et al. | 310/75 R |
| 6,622,500 B1 | * 9/2003 | Archibald et al. | 62/173 |

FOREIGN PATENT DOCUMENTS

JP                406307722 A    * 11/1994

* cited by examiner

Primary Examiner—William E. Tapolcai
Assistant Examiner—Mohammad M. Ali
(74) Attorney, Agent, or Firm—Patrick M. Griffin

(57) ABSTRACT

An air conditioning system using a refrigerant to control a temperature of a climate-controlled area. The air conditioning system comprises a refrigerant circuit and a compressor coupled to the refrigerant circuit. The compressor includes a compression mechanism comprising a swash plate and at least one piston engaging the swash plate for compressing the refrigerant. An electric motor has a drive shaft that supports the swash plate at an inclination angle. The swash plate is adjustable between a plurality of inclination angles or stroke positions to adjust a current pressure in a low-side pressure portion of the refrigerant circuit. An electronic control valve adjusts the compression mechanism between the plurality of stroke positions to adjust the current pressure. A controller is programmed to control the electronic control valve until the current pressure is within a predetermined limit of a target pressure. A pressure sensor is coupled to the refrigerant circuit to measure the current pressure in the refrigerant circuit.

13 Claims, 5 Drawing Sheets

AIR CONDITIONING SYSTEM WITH ELECTRIC COMPRESSOR

FIELD OF THE INVENTION

The present invention relates to an air conditioning system using a refrigerant to control a temperature of a climate-controlled area. More specifically, the present invention relates to an air conditioning system utilizing a compressor driven by an electric motor and having an adjustable compression mechanism to control a current pressure in the refrigerant circuit thereby controlling the temperature of the climate-controlled area.

BACKGROUND OF THE INVENTION

Air conditioning systems using a refrigerant are well known in the art for controlling a temperature of climate-controlled areas such as interiors of buildings, vehicle cabins, meat lockers, and the like. A typical prior art, air conditioning system for controlling the temperature of the climate-controlled area comprises a refrigerant circuit for circulating the refrigerant under a pressure. A compressor compresses the refrigerant in the refrigerant circuit and forces the refrigerant in the form of a pressurized gas to a condenser. The condenser then condenses the pressurized gas refrigerant into a pressurized liquid refrigerant. From there, the liquid refrigerant is conveyed to an expansion device in which the liquid refrigerant is expanded to reduce pressure and temperature. Next, the refrigerant is conveyed to an evaporator. Air to be cooled travels across the evaporator and the refrigerant inside the evaporator absorbs heat from the air thereby boiling the refrigerant and converting the refrigerant into a gas. Once the refrigerant has been cycled through the evaporator, an accumulator-dehydrator may be used to separate any remaining liquid refrigerant in the refrigerant circuit that has passed through the evaporator. Liquid refrigerant may foul the compressor. Finally, once separated, the gas refrigerant is conveyed back to the compressor to begin the cycle again.

Typically, when the climate-controlled area is a vehicle cabin, the compressor is belt-driven by a motor of the vehicle. However, more recently, as a result of the trend toward electric, hybrid, and fuel cell vehicles, the compressor is electrically operated. Electrically operated compressors are generally more efficient and in these types of vehicles, energy conservation via efficient components is critical. Likewise, when the climate-controlled area is a building or a meat locker, the compressor is typically electrically operated. Such systems generally utilize variable speed electric motors to adjust a current pressure in the refrigerant circuit to control the temperature of the climate-controlled area. The ability to vary the current pressure in the refrigerant circuit is important in maximizing efficiency of the compressor under different cooling conditions. While variable speed electric motors are capable of varying the current pressure of the refrigerant circuit, most electric motors have a maximum efficiency at one particular speed. Hence, varying the speed of the electric motor is counter-productive in maximizing efficiency of the compressor under different cooling conditions. Furthermore, the electronics required to operate the electric motor at variable speeds are costly, complex, and unreliable.

In alternative systems, multiple compressors operating at different speeds to generate different compression rates are utilized and the air conditioning system varies engagement of these compressors based on different cooling conditions to maximize efficiency. However, such systems are costly and require complex electronics to switch between the compressors.

One solution to the aforementioned problems is suggested in U.S. Pat. No. 6,230,507 to Ban et al. The '507 patent to Ban et al. shows an air conditioning system utilizing a compressor in a refrigerant circuit for controlling a temperature of a climate-controlled area. The compressor of Ban et al. utilizes a variable speed electric motor for driving the compressor. In addition, an adjustable compression mechanism for compressing the refrigerant is also utilized. Ban et al. teaches adjusting the compression mechanism, as well as adjusting the speed of the electric motor to maximize efficiency of the compressor. In Ban et al., the compression mechanism includes a swash plate and a plurality of pistons engaging the swash plate, as is well known in the art. An electronic control valve is used to vary an inclination angle of the swash plate thereby adjusting the compression mechanism and changing a current pressure in the refrigerant circuit.

Still referring to Ban et al., a controller controls the electronic control valve based on a cooling load on the refrigerant circuit. For example, when the cooling load is great, the controller controls the electronic control valve to reduce the pressure in a crankcase chamber in which the compression mechanism is located thereby increasing the inclination angle of the swash plate. This increases the compression or displacement of the compressor. The controller calculates the cooling load based on an evaporator temperature, a desired or target temperature for the climate controlled area, the current temperature of the climate-controlled area, and an outside temperature. This information is sent to the controller via control signals from sensors in the air conditioning system.

SUMMARY OF THE INVENTION AND ADVANTAGES

The present invention provides an air conditioning system using a refrigerant to control a temperature of a climate-controlled area. The air conditioning system comprises a refrigerant circuit for conveying the refrigerant at a pressure. A compressor housing is coupled to the refrigerant circuit and a compression mechanism is disposed in the compressor housing to compress the refrigerant. An adjustment mechanism adjusts the compression mechanism between a plurality of stroke positions to adjust a current pressure in the refrigerant circuit. A motor having a drive shaft coupled to the compression mechanism is electrically operated to move the drive shaft. A controller is programmed to determine a target pressure for the refrigerant circuit and to control the adjustment mechanism to adjust the compression mechanism between the plurality of stroke positions. This adjusts the current pressure in the refrigerant circuit. A pressure sensor is coupled to the refrigerant circuit to measure the current pressure in the refrigerant circuit and transmit a signal to the controller indicative of the current pressure. The controller then controls the adjustment mechanism to adjust the current pressure in the refrigerant circuit until the current pressure is within a predetermined pressure limit of the target pressure.

A method of controlling the temperature of the climate-controlled area using the air conditioning system is also provided. The method comprises the steps of measuring a current temperature of the climate-controlled area and establishing a target temperature for the climate-controlled area. Next, a temperature difference between the measured current temperature and the established target temperature is determined. A target pressure is then selected based on the determined temperature difference. A current pressure in the refrigerant circuit is measured and a pressure difference is determined between the selected target pressure and the measured current pressure. The pressure difference is then compared to a predetermined pressure limit. When the pressure difference exceeds the predetermined pressure limit, the current pressure in the refrigerant circuit is adjusted until the determined pressure difference is within the predetermined pressure limit.

The present invention provides several advantages over the prior art. For example, the pressure sensor permits the system to accurately measure a current pressure in the refrigerant circuit. Furthermore, adjusting the compression mechanism between the plurality of stroke positions to adjust the current pressure, while measuring the current pressure, results in a more responsive air conditioning system than systems that adjust the compression mechanism based on temperature of an evaporator. In other words, the adjustment of the compression mechanism can be more precisely controlled and the compressor is more responsive to changing conditions than with prior art systems.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, an air conditioning system using a refrigerant to control a temperature of a climate-controlled area 12 is generally shown at 10.

Figure 3:
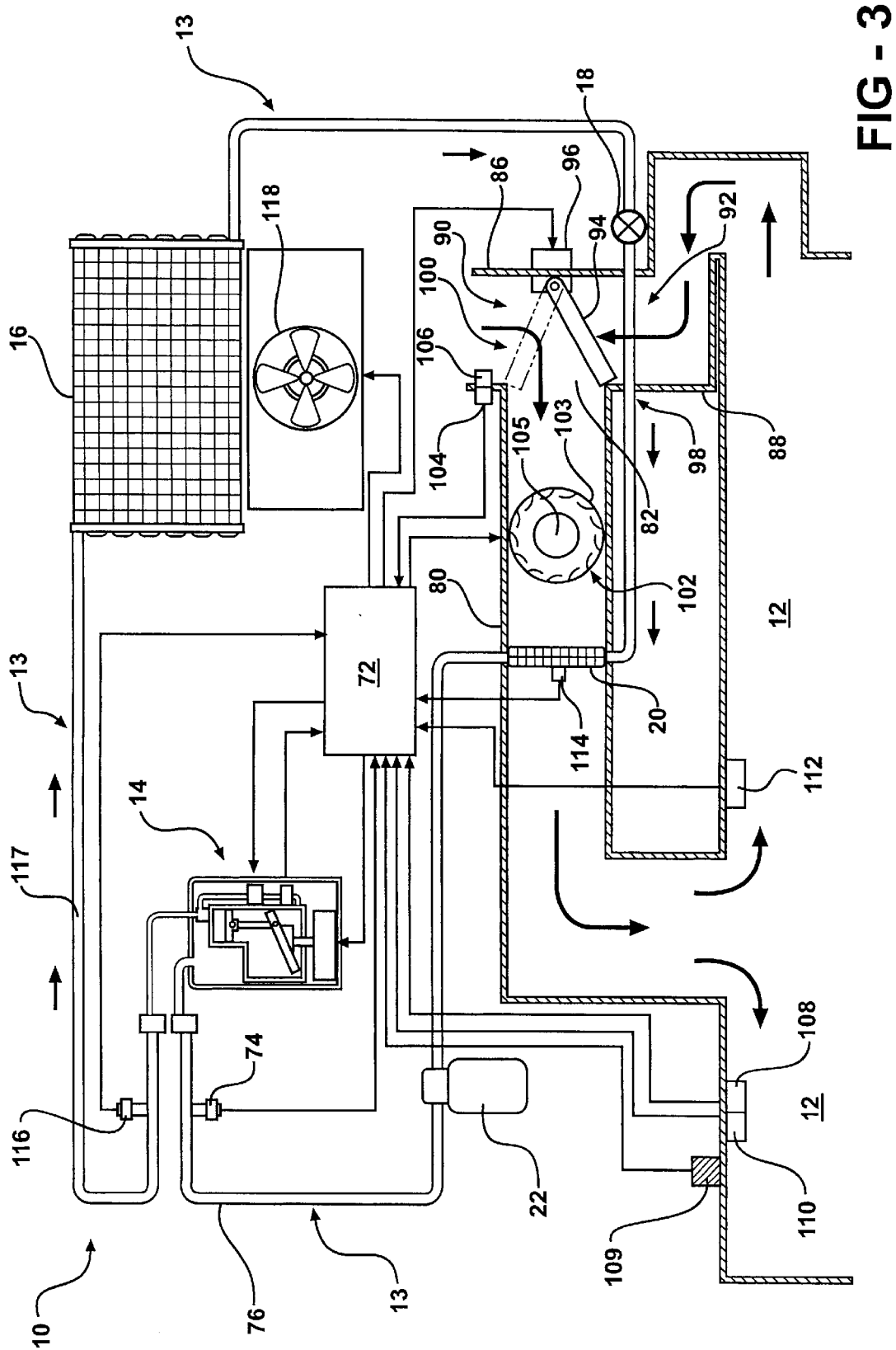
FIG. 3 is a schematic view of an air conditioning system of the present invention.

The climate-controlled area 12, best shown in FIG. 3, may be a vehicle cabin, an interior of a building, a meat locker, and the like. The particular application of the air conditioning system 10 described herein is not intended to be limiting.

The air conditioning system 10 utilizes a compressor 14 to compress the refrigerant and circulate the refrigerant through a refrigerant circuit 13. The refrigerant circuit 13 circulates the refrigerant to components of the air conditioning system 10 under pressure. These components are generally illustrated and include a condenser 16, an expansion device 18, an evaporator 20, and an accumulator-dehydrator 22.

Figure 2:
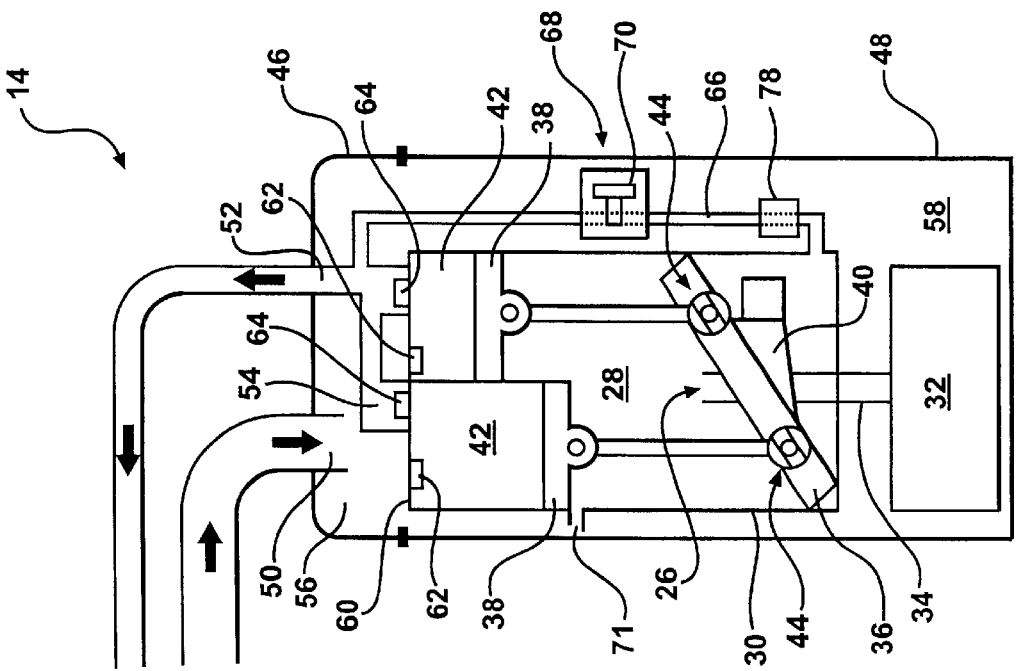
FIG. 2 is a schematic view of a compressor of the present invention illustrating a multi-cylinder embodiment.
Figure 1:
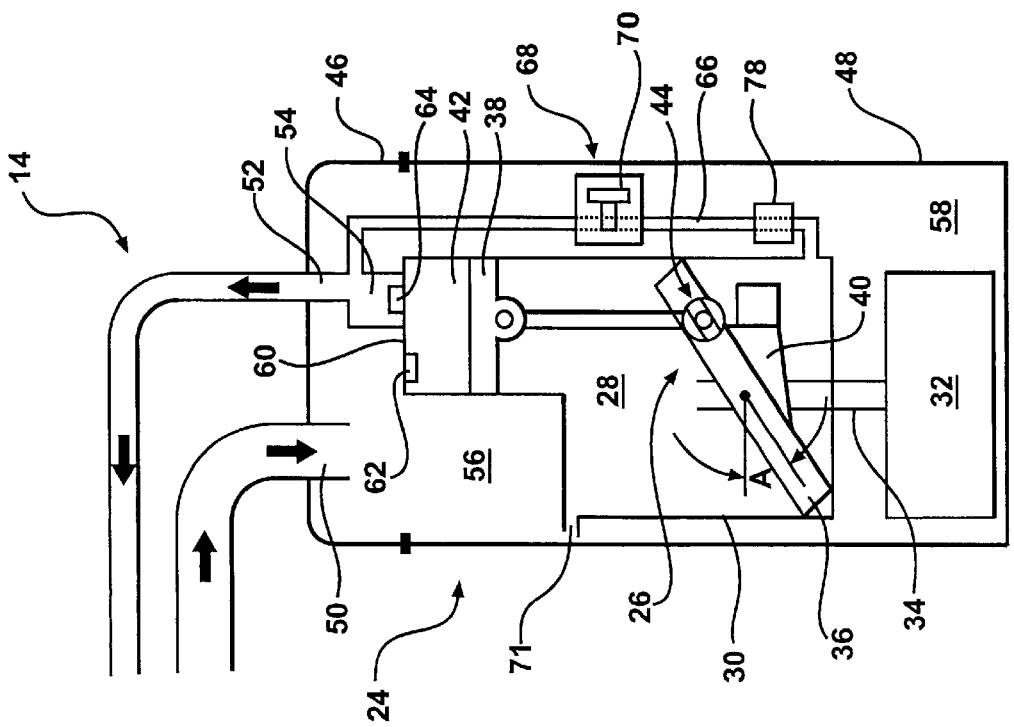
FIG. 1 is a schematic view of a compressor of the present invention illustrating a single cylinder embodiment.

With reference to FIGS. 1 and 2, the compressor 14 shall be hereinafter described. It should be appreciated that the compressor 14 of the present invention includes components that are well known to those skilled in the air conditioning arts. Hence, the components of the compressor 14 shall be generally illustrated and described. Furthermore, FIGS. 1 and 2 are merely schematic representations of the compressor 14, as taken in cross-section.

The compressor 14 includes a compressor housing 24 coupled to the refrigerant circuit 13. A compression mechanism 26 is disposed in the compressor housing 24. In particular, the compression mechanism 26 is disposed in a crankcase chamber 28 defined by a cylinder block 30 of the compressor housing 24. The compression mechanism 26 is driven by an electrically operated motor 32 having a drive shaft 34. The compression mechanism 26 comprises a compression plate 36 such as a swash plate or wobble plate coupled to the drive shaft 34 and at least one piston 38 coupled to the compression plate 36 for reciprocating in the compressor housing 24 upon movement of the compression plate 36. While either a swash plate or wobble plate configuration may be employed, both being well known to those skilled in the art, only the swash plate configuration shall be described further. FIG. 1 illustrates a swash plate 36 configuration utilizing one piston 38 to compress the refrigerant and FIG. 2 illustrates a swash plate 36 configuration utilizing multiple pistons 38 to compress the refrigerant. Hence, the number of pistons 38 used in the compressor 14 is not intended to limit the present invention.

A lug plate 40 is secured to the drive shaft 34 in the crankcase chamber 28. The swash plate 36 slides on a surface of the drive shaft 34 in an axial direction, which varies inclination with respect to the axis of the drive shaft 34. The swash plate 36 is coupled to the lug plate 40 by a hinge mechanism (not shown). The hinge mechanism rotates the swash plate 36 together with the lug plate 40 and permits the swash plate 36 to slide axially and incline with respect to the drive shaft 34.

Cylinder bores 42 are formed in the cylinder block 30 and the pistons 38 are accommodated in each cylinder bore 42 and coupled to the swash plate 36 through a corresponding pair of shoes 44. The swash plate 36 converts the rotation of the drive shaft 34 into reciprocation of each piston 38 in the cylinder bores 42.

The compressor housing 24 comprises a head portion 46 and a body portion 48 hermetically sealed to the head portion 46. By hermetically sealing the head portion 46 to the body portion 48, the refrigerant entering the compressor housing 24 can be used to cool the electric motor 32. The head portion 46 defines an inlet 50 for receiving the refrigerant from the refrigerant circuit 13 and an outlet 52 for conveying the refrigerant back to the refrigerant circuit 13 once the refrigerant is compressed. The head portion 46 further defines a discharge chamber 54 for conveying the refrigerant to the outlet 52 and a suction chamber 56 for receiving the refrigerant from the inlet 50. These chambers are generally annular and the suction chamber 56 surrounds the discharge chamber 54. The electric motor 32 is positioned in a motor chamber 58 in direct fluid communication with the suction chamber 56 such that the refrigerant entering the compressor housing 24 through the inlet 50 cools the electric motor 32.

A valve plate 60 includes suction valve mechanisms 62 and discharge valve mechanisms 64, which respectively correspond to each cylinder bore 42. Each suction valve mechanism 62 admits refrigerant gas from the suction chamber 56 to the corresponding cylinder bore 42. Each discharge valve mechanism 64 permits compressed refrigerant gas to flow from the corresponding cylinder bore 42 to the discharge chamber 54.

A pressurizing passage 66 interconnects the discharge chamber 54 and the crankcase chamber 28 to regulate the pressure in the crankcase chamber 28.

An adjustment mechanism 68 adjusts the compression mechanism 26 between a plurality of stroke positions to adjust a current pressure in the refrigerant circuit 13. More specifically, the compression plate 36, i.e., swash plate 36, lies at an inclination angle A relative to the drive shaft 34 and the plurality of stroke positions correspond to a plurality of inclination angles A. The adjustment mechanism 68 adjusts the inclination angle A of the swash plate 36 thereby controlling displacement of the compression mechanism 26 and controlling the current pressure in the refrigerant circuit 13. The inclination angle A is illustrated in FIG. 1.

The adjustment mechanism 68 includes an electronic control valve 70 disposed in the pressurizing passage 66 and operable between open and closed positions for opening the pressurizing passage 66 in the open position and closing the pressurizing passage 66 in the closed position. Electronic control valves are well known in the art for controlling displacement and will not be discussed in detail. One example of a similar electronic control valve 70 is shown in U.S. Pat. No. 6,247,900 to Archibald et al., herein incorporated by reference. Generally, the electronic control valve 70 includes a solenoid (not shown), a valve body (not shown), and a valve hole (not shown). The valve body is operated by the solenoid to open and close the valve hole. When the solenoid is excited, the valve body closes the valve hole, which closes the pressurizing passage 66. When the solenoid is de-excited, the valve body opens the valve hole thereby opening the pressurizing passage 66.

Opening the pressurizing passage 66 allows pressurized refrigerant gas in the discharge chamber 54 to enter the crankcase chamber 28 and closing the pressurizing passage 66 prevents the pressurized refrigerant gas from entering the crankcase chamber 28. Controlling the flow of pressurized refrigerant into the crankcase chamber 28 controls a pressure in the crankcase chamber 28. The compression mechanism 26 adjusts between the plurality of stroke positions, i.e., the inclination angle A of the swash plate 36 is adjusted, based on the pressure in the crankcase chamber 28. When the pressurizing passage 66 is open, the pressure in the crankcase chamber 28 is increased and the inclination angle A of the swash plate 36 decreases. Essentially, the flow of discharge pressure into the crankcase chamber 28 causes increased pressure on the back of the pistons 38 which reduces a crankcase to discharge pressure differential across the pistons 38. The increased pressure on the back of the pistons 38 causes the inclination angle A of the swash plate 36 to decrease, which reduces compressor stroke and displacement.

Conversely, when the pressurizing passage 66 is closed, the pressure in the crankcase chamber 28 is reduced and the inclination angle A of the swash plate 36 increases. Here, a fixed bleed orifice 71 defined in the cylinder block 30 provides operative communication between the crankcase chamber 28 and the suction chamber 56 to allow refrigerant gas in the crankcase chamber 28 to bleed into the suction chamber 56. When the pressurizing passage 66 is closed, the pressure in the crankcase chamber 28 is reduced via the fixed bleed orifice 71. Hence, there is less pressure acting on the back of the pistons 38, which causes the inclination angle A of the swash plate 36 to increase. This increases compressor stroke and displacement.

The electronic control valve 70 adjusts the flow rate of refrigerant gas in the pressurizing passage 66. In particular, the valve body is moved relative to the valve hole to open and close the pressurizing passage 66. Preferably, the supply of electric current to the solenoid is controlled by a pulse width modulated signal transmitted in a duty cycle to continually repeat excitation and de-excitation of the solenoid. By changing the duty cycle, the ratio of excitation time to de-excitation time, is changed. This results in adjusting the flow rate of the refrigerant gas in the pressurizing passage 66. In this way, the inclination angle A of the swash plate 36 is adjusted.

Any type of electronic control valve 70 may be employed. For instance, in one type of electronic control valve 70, the solenoid is excited at a frequency of sixteen Hz. In a second type of electronic control valve 70, the solenoid is excited at a high frequency, typically four hundred Hz with the pulse width modulated signal. In this instance, since the switching frequency is very high, the valve body or plunger, does not reach the end of travel during each electrical cycle and the movement appears linear to the naked eye. This type of electronic control valve 70 is commonly referred to as a dither-type. In essence, while the movement of the valve body appears linear to the naked eye, the valve body slightly "dithers" during the movement.

Referring to a control system shown in FIG. 3, a controller 72 controls the air conditioning system 10. The controller 72 may comprise a processor for various computations as will be described further below, a read only memory (ROM) for storing programs, and a random access memory (RAM) for temporarily memorizing data. The controller 72 is programmed to control the adjustment mechanism 68 to adjust the compression mechanism 26 between the plurality of stroke positions thereby changing the current pressure in the refrigerant circuit 13. These controls will be described further below.

A pressure sensor 74 or transducer is coupled to the refrigerant circuit 13 to measure a current pressure in the refrigerant circuit 13 and transmit a signal to the controller 72 indicative of the current pressure. More specifically, the refrigerant circuit 13 defines a low-side pressure portion 76 between the evaporator 20 and the compressor housing 24 and the pressure sensor 74 is coupled to the refrigerant circuit 13 at the low-side pressure portion 76 to measure the current pressure in the low-side pressure portion 76. Using the pressure sensor 74 to continuously monitor the current pressure, the controller 72 selects a target pressure for the system based on cooling requirements and adjusts the current pressure until within a predetermined pressure limit of the target pressure. This promotes efficiency in the compressor 14.

The pressure sensor 74 may be a conventional stainless steel pressure sensor 74 having a diaphragm (not shown) that is subject to flexure due to the pressure differential across it. The mechanical strain associated with the flexure is detected by a piezo-resistor circuit (not shown) formed on the diaphragm. The pressure sensor 74 could be inserted into a port (not shown) of a refrigerant conduit defining the refrigerant circuit 13 at the low-side pressure portion 76 such that the diaphragm faces the refrigerant flow. It should be appreciated that the refrigerant circuit 13 illustrated in FIG. 3 also represents the refrigerant conduit for conveying the refrigerant. Additionally, the pressure measured in the low-side pressure portion 76 by the pressure sensor 74 could be calibrated to indicate the absolute pressure of the refrigerant in the low-side pressure portion 76, as opposed to a gauge pressure that varies with ambient or barometric pressure.

A stroke sensor 78 is disposed near the compression mechanism 26, specifically the swash plate 36, to measure the inclination angle A of the swash plate 36 and transmit a signal to the controller 72 indicative of the inclination angle A. The stroke sensor 78 is shown in U.S. Pat. No. 6,247,900 to Archibald et al., herein incorporated by reference.

Now referring back to the components of the refrigerant circuit 13 shown in FIG. 3, the refrigerant is compressed in the compressor 14 and is then sent to the condenser 16. In the condenser 16, the refrigerant changes from a pressurized gas to a pressurized liquid. The refrigerant is then conveyed to the expansion device 18. The expansion device 18 reduces the temperature and pressure of the refrigerant. From the expansion device 18, the refrigerant enters the evaporator 20. Air that is to be cooled moves across the evaporator 20 and transfers heat to the refrigerant. In turn, the refrigerant is converted to a gas. The gas refrigerant, occasionally with small amounts of liquid refrigerant, is then sent to the accumulator-dehydrator 22 in which the gas refrigerant is separated from the liquid refrigerant. Liquid refrigerant may foul the compressor 14. Finally, the gas refrigerant enters the compressor 14 to begin the cycle again. In should be appreciated that the refrigerant circuit 13 and the components coupled thereto have been generally illustrated and are not intended to limit the present invention.

A housing 80 surrounds the evaporator 20 wherein the housing 80 defines at least one inlet 82 and at least one outlet 84 to direct air across the evaporator 20 from the inlet 82 to the outlet 84. In particular, the housing 80 has an outside air branch 86 and a recirculating air branch 88 extending therefrom. The outside air branch 86 defines an outside air duct 90 and the recirculating air branch 88 defines a recirculating air duct 92. The outside air duct 90 and recirculating air duct 92 feed into the inlet 82. Air from the climate-controlled area 12 is routed through the recirculating air duct 92 into the inlet 82 and air from outside of the housing 80 is routed through the outside air duct 90 into the inlet 82. A damper door 94 engages the housing 80 at the inlet 82 and a damper door actuator 96 responsive to the controller 72 moves the damper door 94 through a plurality of positions between an outside air position 98 and a recirculated air position 100 to control air flow from the outside air duct 90 and recirculating air duct 92, or a combination thereof.

A blower 102 comprising a fan 103 and motor 105 is coupled to the housing 80 and includes a variable speed control responsive to the controller 72 to blow air across the evaporator 20 at varying rates.

An air flow sensor 104 is disposed near the inlet 82 and is attached to the outside air branch 86 to measure a rate of air flow into the inlet 82 from the outside air duct 90 and transmit a signal to the controller 72 indicating the rate of air flow. Since the area of the outside air duct 90 is constant, the air flow sensor 104 measures the velocity of the air and calculates an air flow rate.

A humidity sensor 106 is disposed at the inlet 82 and attached to the outside air branch 86 to measure a humidity of the air flow into the inlet 82 from the outside of the housing 80. The humidity sensor 106 transmits a signal to the controller 72 indicating the humidity of the air flow.

A temperature sensor 108 is disposed within the climate-controlled area 12 and measures a current temperature of the climate-controlled area 12. The temperature sensor 108 transmits a signal to the controller 72 indicating the current temperature. Similarly, a temperature sensor 109 is disposed outside of the climate-controlled area 12 to measure an outside air temperature.

A temperature control unit 110 is disposed within the climate-controlled area 12 to establish a target temperature for the climate-controlled area 12. Once established, the temperature control unit 110 transmits a signal to the controller 72 indicating the target temperature. Temperature control units are well known in the art for allowing users to request a desired or target temperature.

A second humidity sensor 112 is disposed in the climate-controlled area. 12 to measure a humidity of the air in the climate-controlled area 12 and transmit a signal to the controller 72 indicating the humidity of the air.

A second temperature sensor 114 is disposed near the evaporator 20 to measure a temperature of the evaporator 20 and transmit a signal to the controller 72 indicating the temperature of the evaporator 20.

A high-side pressure sensor 116 or transducer is coupled to a high-side pressure portion 117 of the refrigerant circuit 13. The high-side pressure portion 117 of the refrigerant circuit 13 is defined between the compressor 14 and the condenser 16. The high-side pressure transducer 116 measures a pressure in the high-side pressure portion 117 and transmits a signal to the controller 72 indicative of the pressure in the high-side pressure portion 117.

A first condenser fan 118 is disposed near the condenser 16 and includes a variable speed control responsive to the controller 72 to vary a speed of the first condenser fan 118 to vary a rate of air flow across the condenser 16. A second condenser fan (not shown) may also be positioned near the condenser 16 and controlled by the variable speed control to vary a speed of the second condenser 16 fan to further vary the rate of air flow across the condenser 16.

Figure 4:
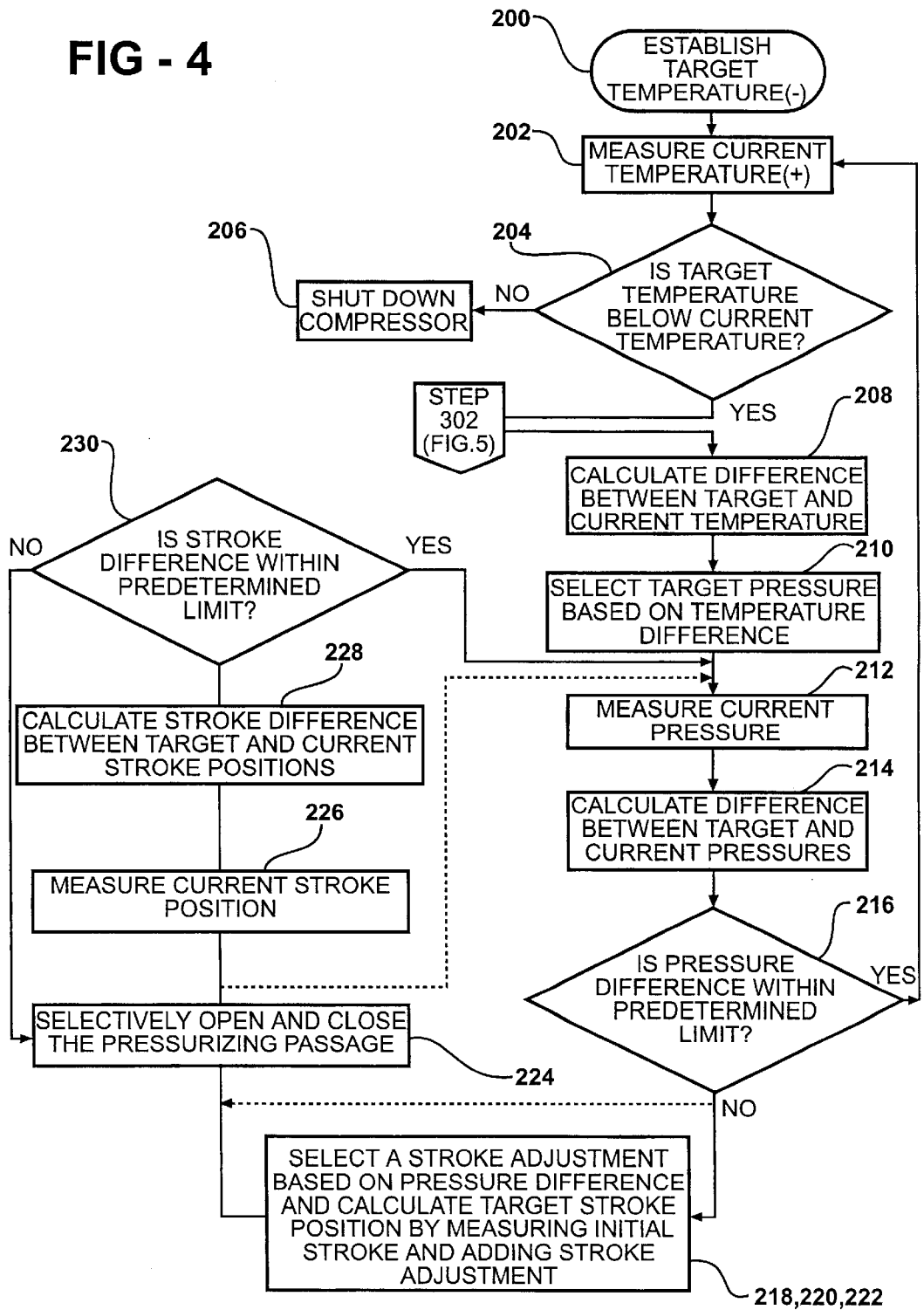
FIG. 4 is a flow diagram of steps carried out by a controller of the present invention.
Figure 5:
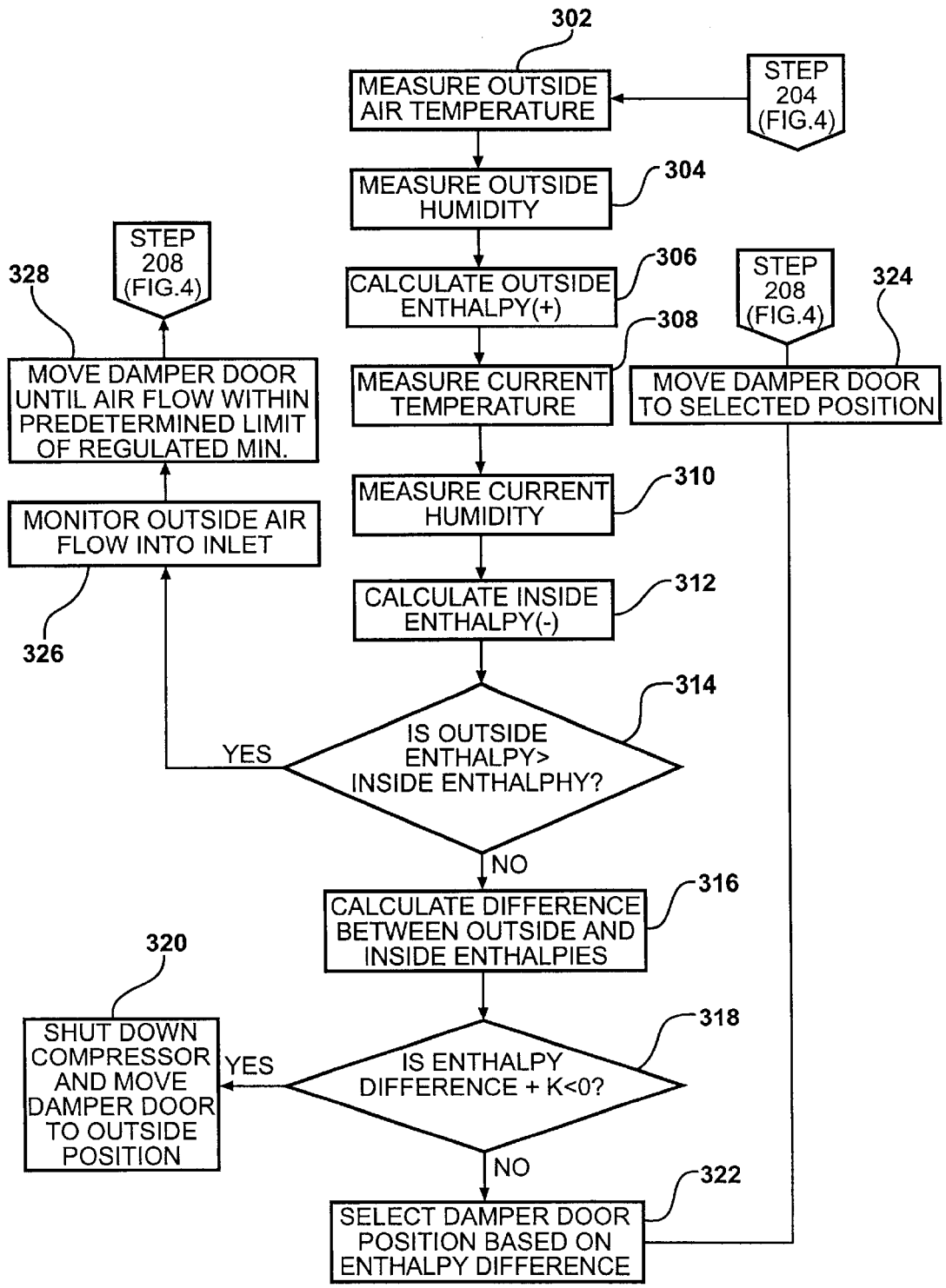
FIG. 5 is a flow diagram of steps carried out by the controller of the present invention.

Control of the air conditioning system 10 will now be described with reference to a flow diagram of FIGS. 4 and 5. The flow diagram of FIGS. 4 and 5 show but one example of a control procedure for the air conditioning system 10 performed by the controller 72. The routine shown in FIGS. 4 and 5 is repeatedly executed while the air conditioning system 10 is operated.

To start, referring specifically to FIG. 4, a target temperature for the climate-controlled area 12 must be established as indicated at STEP 200. The temperature control unit 110 establishes the target temperature as a result of the user actuating the temperature control unit 110 to adjust a current temperature in the climate-controlled area 12. Once the user selects the desired or target temperature, the temperature control unit 110 sends a corresponding signal to the controller 72.

At STEP 202, the temperature sensor 108 in the climate-controlled area 12 measures the current temperature of the climate-controlled area 12 and transmits a corresponding signal to the controller 72. The controller 72 then determines whether or not the target temperature is below the current temperature at STEP 204. If the target temperature is not below the current temperature, i.e., the climate-controlled area 12 does not need to be cooled, then the compressor 14 is shut down at STEP 206.

If the target temperature is below the current temperature, i.e., the climate-controlled area 12 needs to be cooled, then the controller 72 moves to STEP 302 in FIG. 5, as will be described further below. The steps carried out by the controller 72 in FIG. 5 generally represent control of the damper door 94 based an inside and outside enthalpies. These steps are carried out after the controller 72 has determined that the target temperature, desired by the user, is below the current temperature.

The steps of FIG. 5 will be described further below. Assuming, for now, that the controller 72 has already conducted the steps in FIG. 5, the controller 72 determines, i.e., calculates, a temperature difference between the measured current temperature and the established target temperature at STEP 208. A target pressure is then selected by the controller 72 at STEP 210 for the refrigerant circuit 13, i.e., for the low-side pressure portion 76, based on the determined temperature difference. Specifically, a look-up table is stored in the controller 72 that correlates temperature differences to target pressures. The controller 72 selects the target pressure based on which target pressure corresponds to the temperature difference determined at STEP 208. Next, at STEP 212, the pressure sensor 74 coupled to the refrigerant circuit 13 at the low-side pressure portion 76 measures a current pressure in the low-side pressure portion 76 of the refrigerant circuit 13.

The controller 72 determines, i.e., calculates, a pressure difference between the selected target pressure and the measured current pressure at STEP 214. At STEP 216, the controller 72 determines whether the determined pressure difference is within a predetermined pressure limit. The predetermined pressure limit may be set at any pressure. For example, the predetermined pressure limit may be set at one pound per square inch gauge (psig). If the pressure difference is maintained within one psig, the compressor 14 continues to operate at a current displacement, i.e., the current pressure does not need to be adjusted. Hence, the controller 72 recognizes that the compressor 14 shall continue running "as is" by moving back to STEP 202 to again measure the current temperature. The controller 72 cycles between STEPS 202 and 216 until either the compressor 14 is shut down or the calculated pressure difference exceeds the predetermined limit.

If the pressure difference exceeds the predetermined limit, the current pressure in the refrigerant circuit 13 requires adjustment until the determined pressure difference is within the predetermined pressure limit, i.e., until the current pressure is within the predetermined pressure limit of the target pressure. The steps carried out by the controller 72 to adjust the current pressure are indicated in FIG. 4 as STEPS 218 through 230. In essence, the controller 72 adjusts the current pressure by either increasing or decreasing the displacement of the compressor 14. As recited above, this can be accomplished by selectively opening and closing the pressurizing passage 66 to adjust an inclination angle A of the swash plate 36, i.e., stroke position of the compression mechanism 26. As the inclination angle A changes, the current pressure in the low-side pressure portion 76 of the refrigerant circuit 13 also changes. For instance, as the inclination angle A increases and the displacement increases, the current pressure in the low-side pressure portion 76 decreases. Conversely, as the inclination angle A decreases and the displacement decreases, the current pressure in the low-side pressure portion 76 increases.

The selective opening and closing continues until the pressure difference is within the predetermined pressure limit. The electronic control valve 70 is controlled by the controller 72 to selectively open and close the pressurizing passage 66 by transmitting the pulse width modulated signal in the duty cycle to the solenoid of the electronic control valve 70. A proportional integral derivative (PID) is used in a control loop to selectively open and close the pressurizing passage 66 until the pressure difference is within the predetermined pressure limit. Other types of control methodologies could also be utilized such as Fuzzy or Neural methodologies. As shown in FIG. 4, the above-mentioned adjustment can be controlled based on the pressure difference alone, i.e., the air conditioning system 10 is controlled to pressure alone. The hidden lines shown in FIG. 4, wherein the controller 72 bypasses STEPS 218–222 and 226–230, illustrate this.

Alternatively, the controller 72 can control the air conditioning system 10 based on the inclination angle A of the swash plate 36, i.e., stroke position of the compression mechanism 26, as well as pressure. This is indicated in STEPS 218–222 and 226–230. At STEP 218, the controller 72 selects a stroke adjustment for the compression mechanism 26 based on the pressure difference. A look-up table is stored in the controller 72 that correlates pressure difference to stroke adjustments. For instance, a five-psig pressure difference may correspond to a ten percent stroke adjustment. Once the stroke adjustment is selected, the controller 72 can measure an initial stroke position, for instance fifty percent, using the stroke sensor 78 at STEP 220 and calculate a target stroke position at STEP 222 by adding the measured initial stroke position and selected stroke adjustment to yield sixty percent. The percentages referred to indicate percentage of full inclination of the swash plate 36. Hence, at zero percent the compressor 14 has a low displacement and at one hundred percent, the compressor 14 has the largest displacement. Other measuring units could be utilized. Once the stroke adjustment is selected, the pressurizing passage 66 is selectively opened and closed in STEP 224 based on the stroke adjustment to change the current pressure in the low-side pressure portion 76.

As described above, the electronic control valve 70 is controlled by the controller 72 to selectively open and close the pressurizing passage 66 by transmitting the pulse width modulated signal in the duty cycle to the solenoid of the electronic control valve 70. Again, PID, Fuzzy, Neural, or other type of control methodologies may be used in a control loop to selectively open and close the pressurizing passage 66 based on the magnitude and direction of the stroke adjustment.

Once the pressurizing passage 66 is selectively opened and closed to adjust the stroke position of the compression mechanism 26, the controller 72 measures a current stroke position of the compression mechanism 26 at STEP 226. The stroke sensor 78 measures the current stroke position and sends a corresponding signal to the controller 72. The current stroke position is then compared to the target stroke position calculated in STEP 222 to calculate a stroke difference at STEP 228 between the determined target stroke position and the measured current stroke position. Once the controller 72 calculates the stroke difference, the controller 72 determines whether the stroke difference is within a predetermined stroke limit at STEP 230. If not, the controller 72 returns to STEP 224 to possibly vary the rate in which the pressurizing passage 66 is opened and closed. As previously mentioned, the stroke control may be a PID, Fuzzy, or Neural control. If the stroke difference is within the predetermined stroke limit, then the controller 72 again measures the current pressure in the low-side pressure portion 76 and determines whether the current pressure is within the predetermined limit of the target pressure. In other words, even though the stroke position is at a desired level, the controller 72 still controls to the pressure in the low-side pressure portion 76.

Now referring to the steps carried out in FIG. 5, as linked to FIG. 4 by STEP 302. To start, the temperature sensor 109 outside of the climate-controlled area 12 measures the outside air temperature at STEP 302 and sends a corresponding signal to the controller 72. Next, the humidity sensor 106 outside of the climate-controlled area 12 measures the outside humidity of the outside air at STEP 304 and sends a corresponding signal to the controller 72. The controller 72 then calculates an outside enthalpy based on the measured outside air temperature (T) and humidity (H). An exemplary equation for calculating the enthalpy is as follows. The temperature is typically measured in dry bulb air temperature (degrees Fahrenheit) and the humidity is expressed in absolute humidity (lbs of water/lbs of dry air) and the enthalpy (E) is expressed as:

$$E=(0.24*T)+[H*(1061+0.444*T)]$$

Similarly, a current temperature and a current humidity of the climate-controlled area 12 are measured at STEPS 308 and 310. An enthalpy of the climate-controlled area 12, i.e., inside enthalpy is then calculated at STEP 312 using the above equation. Of course, other equations and methods for determining enthalpy, such as a look-up table in the controller 72, may be employed. Next, the controller 72 determines whether the outside enthalpy is greater than the inside enthalpy at STEP 314. Since enthalpy represents a heat content of the air, if the outside enthalpy, i.e., outside heat content is greater than the inside enthalpy, i.e., inside heat content, the controller 72 is programmed to either move the damper door position to fully close (not shown) the outside air duct 90 or at least move the damper door 94 to a minimum position.

In the context of the building, certain regulations require that a minimum outside air flow be maintained at all times, resulting in the minimum position of the damper door 94. These regulations often specify a regulated minimum of ninety cubic feet per minute of air flow from the outside air duct 90. The steps carried out to determine the minimum damper door position based on such regulations are shown in STEPS 326 and 328. First, the air flow sensor 104 continuously measures the air flow rate into the inlet 82 from the outside air duct 90 and sends a corresponding signal to the controller 72. The controller 72 continuously monitors the air flow rate, as indicated in STEP 326. Then, while continuously monitoring the air flow rate, the controller 72 actuates the damper door 94 until the air flow rate is within a predetermined limit of the regulated minimum air flow rate, as illustrated in STEP 328. This is the minimum damper door position. Of course, as the blower speed changes, or as other conditions change, the minimum damper door position also changes. Hence, these STEPS could be continuously carried out to maintain the proper damper door position. Once the minimum damper door position is determined, the controller 72 moves to STEP 208 in FIG. 4, as described above.

STEPS 316 through 324 illustrate the steps carried out when the outside enthalpy is less than or equal to the inside enthalpy. In STEP 316, the controller 72 first calculates the enthalpy difference to determine just how much lower the outside enthalpy is than the inside enthalpy. Then, in STEP 318, the controller 72 makes a determination as to whether the enthalpy difference is so disparate, i.e., the outside enthalpy is that much lower than the inside enthalpy that the compressor 14 isn't even needed and outside air alone can be used to cool the interior of the building, as shown in STEP 320. For STEP 320 to occur, the enthalpy difference plus a factor K must be below zero, as shown in STEP 318. For instance, let's say the outside enthalpy is (+)seven lb/lb and the inside enthalpy is (−)eighteen lb/lb. The enthalpy difference is (−)eleven lb/lb. If the factor K is less than eleven, the STEP 318 is satisfied and the controller 72 moves to STEP 320. If the factor K is eleven or greater, then the controller 72 moves to STEP 322.

At STEP 322, the compressor 14 continues to operate, but a damper door position is selected based on the enthalpy difference. Here, the controller 72 may use a look-up table correlating enthalpy differences to damper door positions.

The damper door positions may be expressed as a percentage of fully open to the outside air. In STEP 324, the controller 72 moves the damper door 94 via the damper door actuator 96 to the selected damper door position. Then the controller 72 continues to STEP 208 in FIG. 4 as described above.

It should be appreciated by those skilled in the art that the predetermined differences and predetermined limits described above could include any range or limit and may also include zero. For instance, the predetermined pressure difference may be zero such that when current pressure does not equal the target pressure, the current pressure is adjusted. Similarly, the predetermined stroke limit may be zero such that the current stroke position must equal the target stroke position.

In addition to the steps carried out in FIGS. 4 and 5, the following are additional steps that may be used by the controller 72 to further maximize efficiency of the air conditioning system 10 or to protect the air conditioning system 10 from damage or failure.

One such step is discontinuing power to the electric motor 32 when a pressure in the high-side pressure portion 117 of the refrigerant circuit 13 exceeds an upper limit.

Another step is increasing a speed of the first 118 and/or second condenser fans when the pressure of the high-side pressure portion 117 exceeds a predetermined limit, or alternatively, selectively activating and deactivating the electric motor 32 of the compressor 14 when the pressure of the high-side pressure portion 117 exceeds the predetermined limit.

Another step is discontinuing power to the electric motor 32 of the compressor 14 when the current temperature of the climate-controlled area 12 is below a predeterminied temperature such as a water-freezing temperature or when a temperature of the evaporator 20 in the refrigerant circuit 13 is below the predetermined temperature.

Still another step is energizing the electric motor 32 when a humidity of the climate-controlled area 12 exceeds an upper humidity level. This could occur even though the target temperature and the current temperature are in reasonable proximity to one another. Humidity in the climate-controlled area 12 may make the climate-controlled area 12 "feel" warmer than the current temperature indicates. Hence, the compressor 14 could be activated to simply remove the humidity in the air of the climate-controlled area 12.

Another step is increasing the speed of the blower 102 when the difference between the target pressure and the current pressure exceeds the predetermined pressure limit and the target pressure is below the current pressure. This may speed up the process of adjusting the current pressure to be within the predetermined pressure limit.

Figure 6:
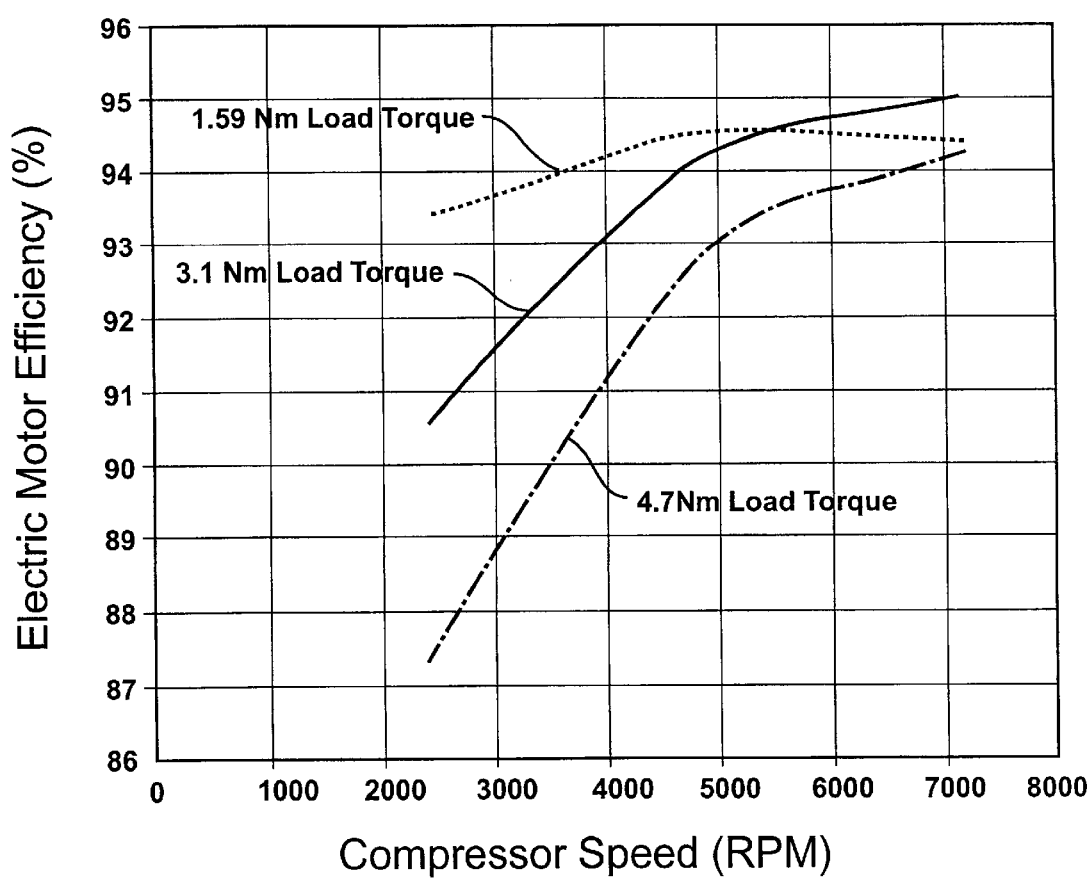
FIG. 6 is a chart illustrating compressor efficiency vs. compressor speed.

As a final step, the electric motor 32 is operated at a constant speed wherein the constant speed used is based upon a maximum efficiency of the compressor 14. Most electric motors having a highest efficiency at one constant speed. Hence, by operating the electric motor 32 of the compressor 14 at one speed, the efficiency of the system can be maintained. For instance, referring to FIG. 6, a graph of electric motor efficiency versus compressor speed is shown at different loading conditions. The graph illustrates that the efficiency of the electric motor 32 under each loading condition quickly rises to a leveling point. For all loading conditions, the leveling point is between five thousand and six thousand rotations per minute (RPM). Hence, the compressor would operate more efficiently if the electric motor 32 could be maintained at these speeds. For this reason, an optimum speed is selected and the electric motor 32 is operated at the optimum speed.

Obviously, many modifications and variations of the present invention are possible in light of the above teachings. The invention may be practiced otherwise than as specifically described within the scope of the appended claims.

What is claimed is:

1. An air conditioning system using a refrigerant to control a temperature of a climate-controlled area comprising:
 a refrigerant circuit for conveying the refrigerant at a pressure;
 a compressor housing coupled to said refrigerant circuit;
 a compression mechanism having a plurality of stroke positions and disposed in said compressor housing for compressing the refrigerant;
 an adjustment mechanism for adjusting said compression mechanism between the plurality of stroke positions to adjust a current pressure in said refrigerant circuit;
 an electrically operated motor having a drive shaft coupled to said compression mechanism for driving said compression mechanism;
 a controller programmed for determining a target pressure for said refrigerant circuit and controlling said adjustment mechanism to adjust said compression mechanism between the plurality of stroke positions to change the current pressure in said refrigerant circuit; and
 a pressure sensor coupled to said refrigerant circuit for measuring a current pressure in said refrigerant circuit and transmitting a signal to said controller indicative of said current pressure whereby said controller controls said adjustment mechanism to change the current pressure in said refrigerant circuit until the current pressure is within a predetermined pressure limit of the target pressure.

2. A system as set forth in claim 1 further including an evaporator coupled to said refrigerant circuit for transferring heat from the climate-controlled area to the refrigerant wherein said refrigerant circuit defines a low-side pressure portion between said evaporator and said compressor housing and said pressure sensor is coupled to said refrigerant circuit at said low-side pressure portion to measure the current pressure in said low-side pressure portion.

3. A system as set forth in claim 2 wherein said compressor housing defines a discharge chamber partitioned from a crankcase chamber, and a pressurizing passage interconnecting said discharge chamber and said crankcase chamber.

4. A system as set forth in claim 3 wherein said adjustment mechanism includes an electronic control valve operable between open and closed positions for opening said pressurizing passage in said open position and closing said pressurizing passage in said closed position whereby opening said pressurizing passage allows pressurized refrigerant in said discharge chamber to enter said crankcase chamber and closing said pressurizing passage prevents the pressurized refrigerant from entering said crankcase chamber whereby controlling the flow of pressurized refrigerant into said crankcase chamber controls a pressure in said crankcase chamber and said compression mechanism adjusts between the plurality of stroke positions based on the pressure in said crankcase chamber.

5. A system as set forth in claim 3 wherein said compression mechanism comprises a compression plate coupled to said drive shaft at an inclination angle and at least one piston coupled to said compression plate for reciprocating in said compressor housing upon movement of said compression plate whereby the plurality of stroke positions correspond to a plurality of said inclination angles such that said inclination angle of said compression plate is adjusted by said controller by opening and closing said pressurizing passage to vary the pressure in said crankcase chamber.

6. A system as set forth in claim 1 further including a stroke sensor near said compression plate for measuring said inclination angle of said compression plate and transmitting a signal to said controller indicative of said inclination angle.

7. A system as set forth in claim 2 including a housing surrounding said evaporator wherein said housing defines at least one inlet and at least one outlet for directing air to be cooled across said evaporator from said inlet to said outlet.

8. A system as set forth in claim 7 further including a blower coupled to said housing and having a variable speed control responsive to said controller for blowing air across said evaporator at varying rates.

9. A system as set forth in claim 8 further including a condenser coupled to said refrigerant circuit downstream of said compressor housing wherein said refrigerant circuit defines a high-side pressure portion between said compressor housing and said condenser.

10. A system as set forth in claim 9 further including a high-side pressure sensor coupled to said high-side pressure portion for measuring a pressure in said high-side pressure portion and transmitting a signal to said controller indicative of the pressure in said high-side pressure portion.

11. A system as set forth in claim 10 further including a first condenser fan near said condenser and having a variable speed control responsive to said controller for varying a speed of said first condenser fan to vary a rate of air flow across said condenser.

12. A system as set forth in claim 11 further including a damper door engaging said housing at said inlet and a damper door actuator responsive to said controller for moving said damper door through a plurality of door positions between an outside air position and a recirculated air position.

13. A system as set forth in claim 1 wherein said compressor housing comprises a head portion and a body portion and said head portion is hermetically sealed to said body portion such that the refrigerant entering said compressor housing can be used to cool said motor.

\* \* \* \* \*